J. BUCHANAN.
MOLDBOARD FOR PLOWS.
APPLICATION FILED FEB. 1, 1911.

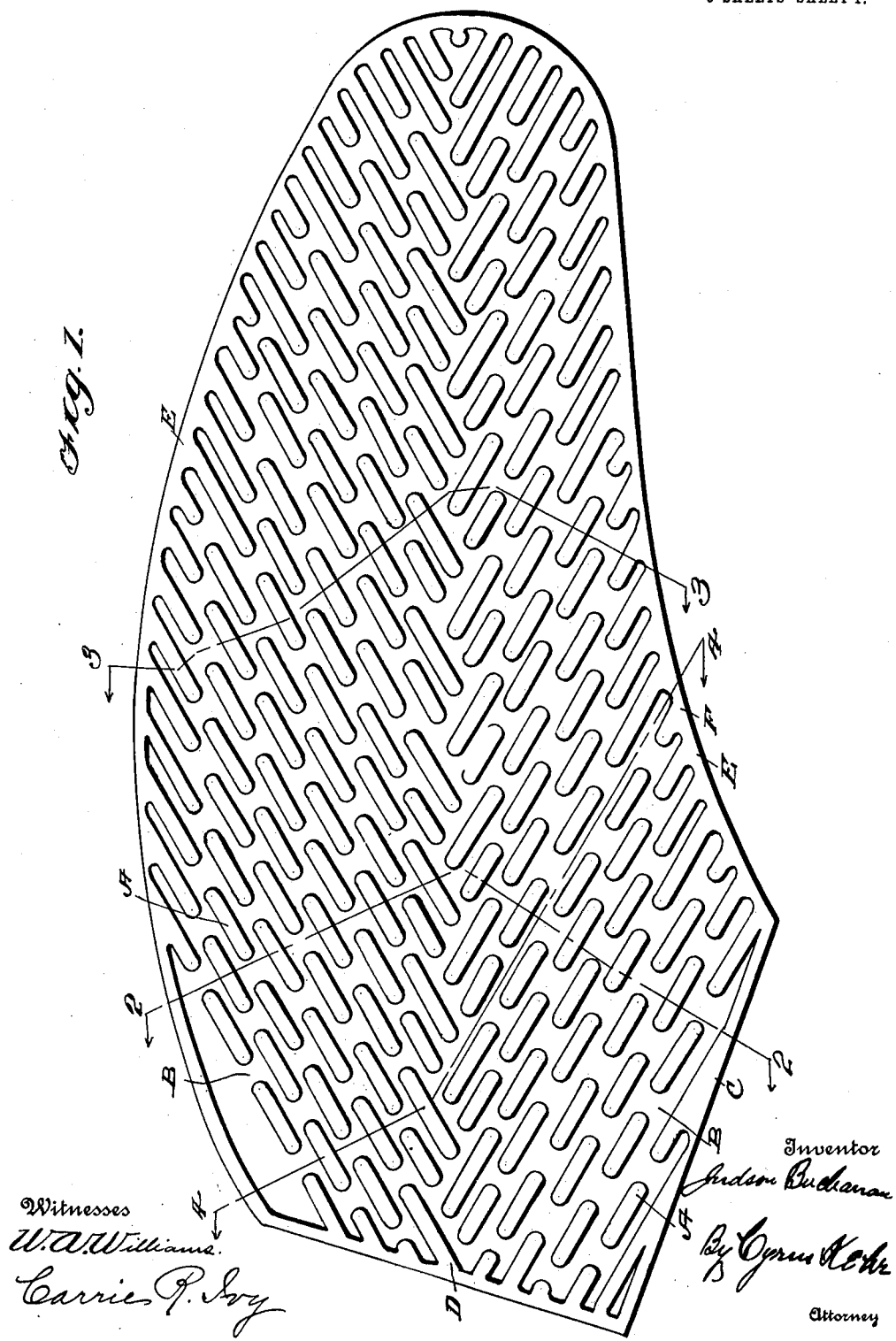

1,035,529.

Patented Aug. 13, 1912.
5 SHEETS—SHEET 2.

Witnesses
W.A.Williams
Carrie R. Ivy

Inventor
Judson Buchanan
By Cyrus Kehr
Attorney

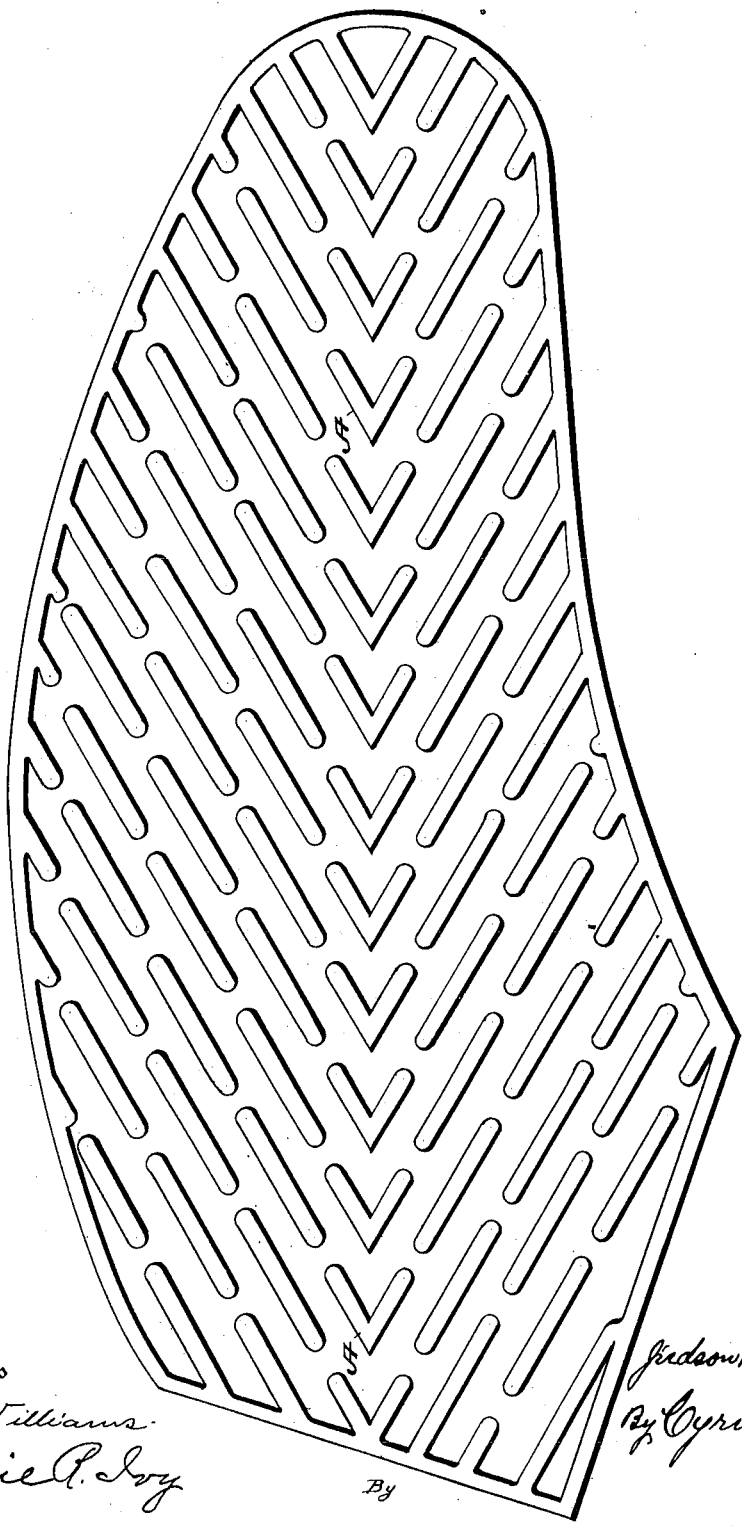

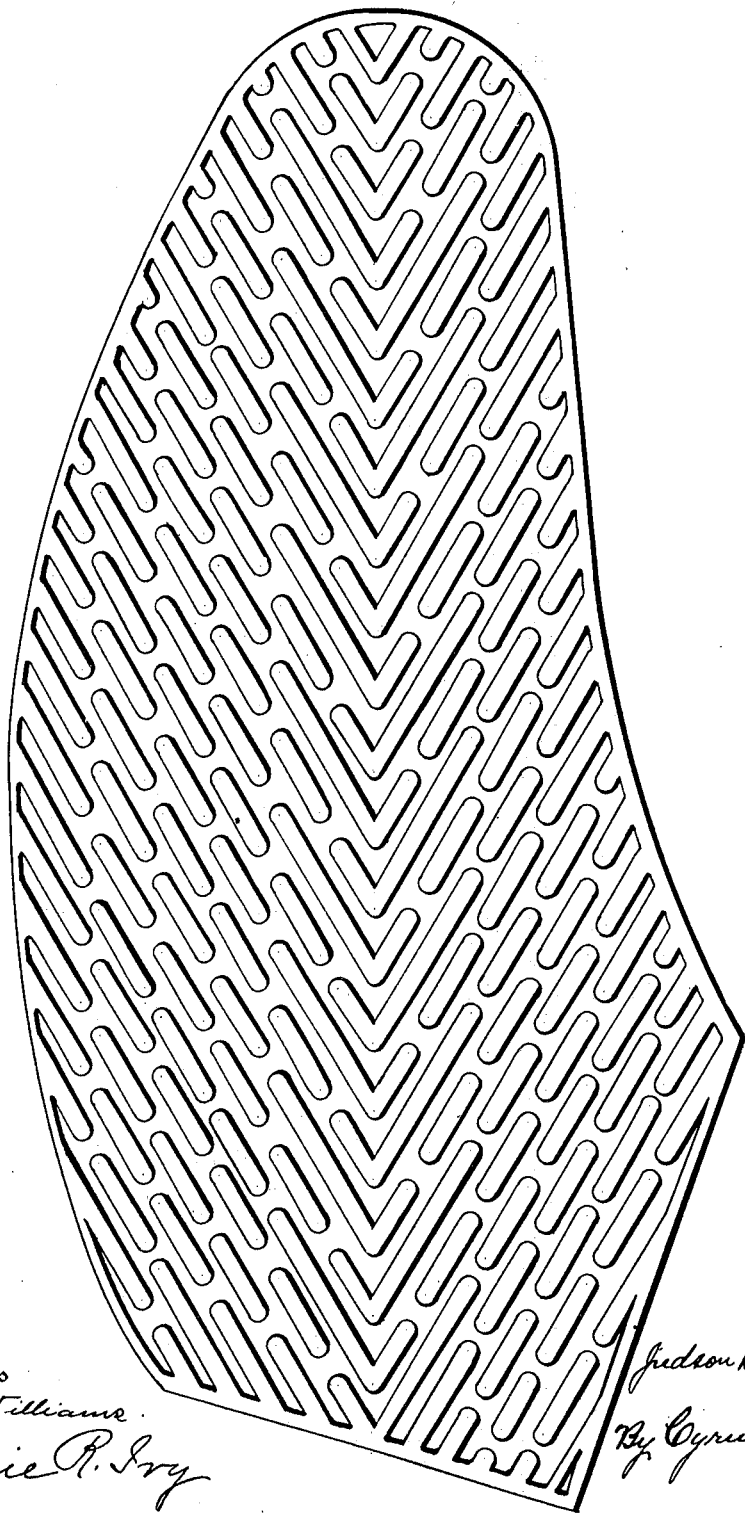

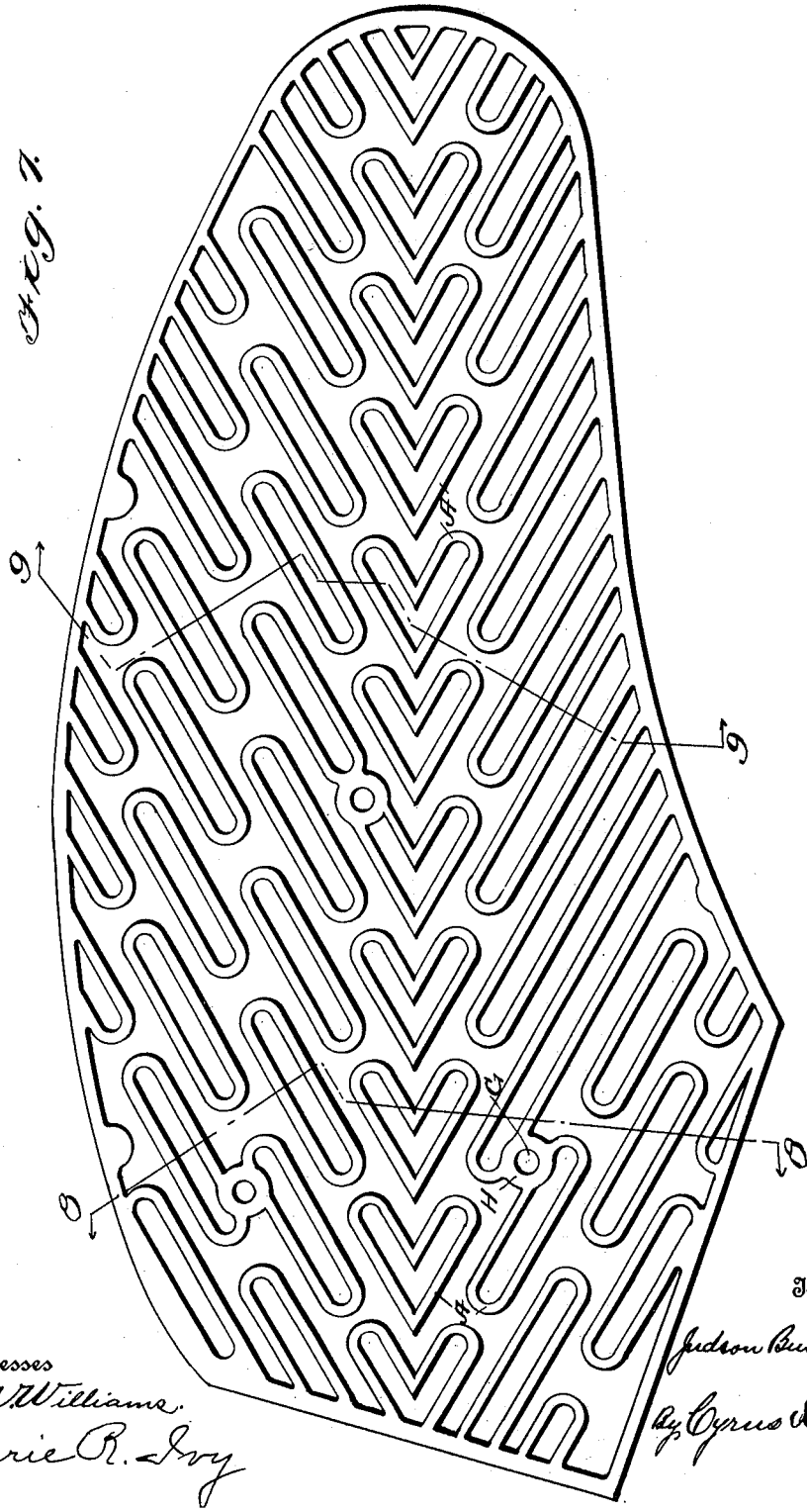

UNITED STATES PATENT OFFICE.

JUDSON BUCHANAN, OF CHATTANOOGA, TENNESSEE.

MOLDBOARD FOR PLOWS.

1,035,529.  Specification of Letters Patent.  Patented Aug. 13, 1912.

Application filed February 1, 1911. Serial No. 605,979.

*To all whom it may concern:*

Be it known that I, JUDSON BUCHANAN, a citizen of the United States, residing at Chattanooga, in the county of Hamilton and State of Tennessee, have invented a new and useful Improvement in Moldboards for Plows, of which the following is a specification, reference being had to the accompanying drawing.

My improvement relates particularly to plow mold-boards formed of cast metal, the object being (1) to eliminate or provide against the action of warping strains which tend to crack or break the mold-board, (2) to make possible the production of a harder chill on the face of the mold-board, and (3) to form the board with required strength and yet of less metal than is used for a board of corresponding size and curvature when made according to the present manner.

Figure 5:
Figure 4:
Figure 4:
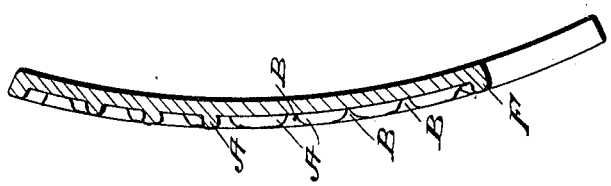
Figure 3:
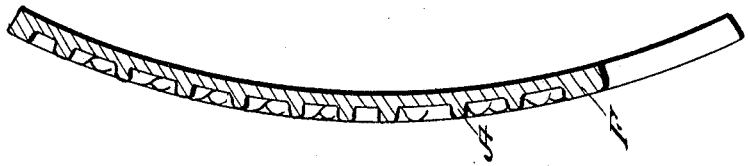
Figure 2:

In the accompanying drawings, Figure 1 is a back view of a mold-board embodying my improvement, it being assumed that the board has been made flat; Fig. 2 is a section on the line 2—2 of Fig. 1; Fig. 3 is a section on the line 3—3 of Fig. 1; Fig. 4 is a section on the line 4—4 of Fig. 1; Figs. 5, 6, and 7 illustrate other forms of my improved mold-board; Fig. 8 is a section on the line 8—8 of Fig. 7; Fig. 9 is a section on the line 9—9 of Fig. 7.

According to the present practice, cast metal plow mold-boards are cast in molds having a metal chill for the wall against which the face of the board is formed while the wall against which the back of the board is formed is composed of sand, the purpose of the chill being to harden the face of the board.

Referring first to Figs. 1, 2, 3, and 4, the drawing shows the back of my improved mold-board provided with single short ribs, A, all of which are directed diagonally toward the middle longitudinal line of the board, those on one side of said middle line converging toward the ribs on the other side. And all the ribs which are in line or approximately in line with each other are separated by gaps, B, and said gaps are non-registering, that is to say, the adjacent gaps are not opposite each other. The edge, C, and the edge, D, have the cross section indicated by the lower portion of Fig. 2; and said edge, C, is ordinarily fitted against the share, while in some cases the edge, D, is also fitted against the share or against a shin-piece or forms the cutting edge of the plow. The edge, E,—all of the edge of the board excepting the edges, C and D,—is preferably formed with a rib, F, as shown in Figs. 2, 3, and 4, said rib being joined by the ribs, A, which are adjacent the edge, E. Such ribs, A, which so join said edge rib may be termed marginal ribs, and the edge, E, may be termed the free edge of the board, and all the ribs may be regarded as elevations.

In such mold-boards made according to the present practice, the strains due to unequal contraction are such as to tend to crack and break on lines extending transversely across the board. I have found by practice that such strains are substantially eliminated by forming and arranging the ribs and gaps in the manner shown and described, the edges of pieces of a board intentionally broken being adapted to be fitted closely and accurately to each other, which is not the case when a board containing such strain has been broken; or one of my improved boards may be struck upon one of the edges sufficiently to form a crack extending from the edge toward the middle of the board, and such crack will remain accurately closed, while a crack made in the same way in a board cast by the old method nearly always gapes open.

While I have above described my improved board as having on its back ribs or elevations, A, it might be said that the board has grooves or channels on its back. For I have made such board, measuring through such elevations, no thicker than the old board having the plain back. Thus it will be seen that my improved board, having such elevations or ribs with gaps and grooves between them, is lighter or composed of less metal than is a similar board made by the old method and being of equal dimensions excepting thickness. Thus my improved board may be made of less metal than is put into the old board, which is a matter of economy in manufacture and makes a plow which is more easily handled. And, it will also be seen that I may use the same amount of metal as is used in a corresponding board made according to the old practice and obtain a board of greater strength.

In Fig. 5, the ribs, A, coming to the longitudinal middle line of the board join each other to make what may be termed angleform ribs along such line, the ribs thus meeting being of approximately equal length. In Fig. 6 the ribs meet in the same manner along said longitudinal line of the board; but they are alternately long and short. In Fig. 7 all the ribs, A, are double or channeled lengthwise, and thus all of said ribs which extend to the longitudinal line of the board from one side of said line join similar ribs on the other side of said line, as is above described concerning Fig. 5. All of these boards are to be provided with bolt-holes, G, around each of which is formed a boss, H, in the usual manner. By thus making a large proportion of the area of the board (all the portions between the ribs) thinner than is the case in the boards made in ordinary practice, the face of the board (formed against the chill) becomes hardened to a greater degree, better adapting the plow to shed or scour in sticky soil. In practice, I have reduced the thickness of a half inch board to five-sixteenths of an inch.

It is to be noted that the elevations on the main area of the rear or under side of the mold-board are non-continuous. That is to say, they are not made long or extended on said face of the mold-board. Gaps occur with such frequency as to make said elevations relatively short. It is to be further noted that these non-continuous elevations are closely arranged; that is, arranged so that no considerable plain or blank places intervene between said elevations. By thus arranging the elevations and making them non-continuous, continuous lines of strain in the cold casting are prevented. And so much of the area of the mold-board as is thus provided with elevations is so guarded against such lines of strain.

I claim as my invention:

1. A cast metal plow mold-board having on its rear or under side an area bearing closely-arranged, non-continuous ribs extending diagonally, in diverse directions, toward the longitudinal middle line of the board, substantially as described.

2. A cast metal plow mold-board having on its rear or under side an area bearing closely-arranged ribs extending in diverse directions and separated transversely by non-registering gaps, substantially as described.

3. A cast metal plow mold-board having on its rear or under side an edge rib and an area bearing closely-arranged, non-continuous ribs separated transversely by non-registering gaps, some of said transversely separated ribs joining said edge rib, substantially as described.

In testimony whereof I have signed my name, in presence of two witnesses, this 16th day of January, in the year one thousand nine hundred and eleven.

JUDSON BUCHANAN.

Witnesses:
 CYRUS KEHR,
 W. F. BLACK.

---

Copies of this patent may be obtained for five cents each, by addressing the "Commissioner of Patents. Washington, D. C."